US011594246B2

(12) United States Patent
Tukada

(10) Patent No.: US 11,594,246 B2
(45) Date of Patent: Feb. 28, 2023

(54) DISK DEVICE

(71) Applicants: Kabushiki Kaisha Toshiba, Tokyo (JP); Toshiba Electronic Devices & Storage Corporation, Minato-ku (JP)

(72) Inventor: Sinji Tukada, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/513,601

(22) Filed: Oct. 28, 2021

(65) Prior Publication Data

US 2022/0310115 A1    Sep. 29, 2022

(30) Foreign Application Priority Data

Mar. 24, 2021  (JP) .............................. JP2021-049569

(51) Int. Cl.
*G11B 33/08* (2006.01)
*G11B 5/012* (2006.01)
*G11B 5/127* (2006.01)

(52) U.S. Cl.
CPC .............. *G11B 5/012* (2013.01); *G11B 5/127* (2013.01)

(58) Field of Classification Search
CPC ... G11B 5/4826; G11B 5/4813; G11B 5/4833; G11B 2220/2516; G11B 5/54; G11B 5/6005; G11B 17/038; G11B 5/484; G11B 5/5521; G11B 17/021; G11B 5/48; G11B 5/012; G11B 33/14; G11B 33/1406; G11B 33/1446; G11B 33/08

USPC ............................................... 360/75
See application file for complete search history.

(56) References Cited

U.S. PATENT DOCUMENTS

| | | | |
|---|---|---|---|
| 6,560,065 B1 | 5/2003 | Yang et al. | |
| 7,457,078 B2 | 11/2008 | Fukaya et al. | |
| 10,373,651 B2 | 8/2019 | Sato | |
| 11,043,235 B2 * | 6/2021 | Mendonsa | G11B 17/021 |
| 11,315,592 B1 * | 4/2022 | Carper | G11B 5/6052 |
| 2019/0074039 A1 | 3/2019 | Sato | |

FOREIGN PATENT DOCUMENTS

| | | |
|---|---|---|
| JP | 2000-331460 A | 11/2000 |
| JP | 2019-046524 A | 3/2019 |

* cited by examiner

*Primary Examiner* — Nabil Z Hindi
(74) *Attorney, Agent, or Firm* — Allen & Overy LLP

(57) ABSTRACT

According to one embodiment, a disk device includes a plurality of recording media, a plurality of magnetic heads, a plurality of blades, and a housing. The recording medium has a recording surface, is rotatable around a rotation axis extending in an axial direction intersecting the recording surface, and is aligned in the axial direction. The magnetic head is configured to read and write information from and to the plurality of recording media. The plurality of first blades forms a spoiler, and the first blades of the plurality are located in a plurality of gaps provided between the plurality of recording media. The housing is provided with an inner chamber in which the plurality of recording media, the plurality of magnetic heads, and the plurality of first blades are accommodated. The number of first blades is smaller than the number of gaps.

20 Claims, 7 Drawing Sheets

DISK DEVICE

CROSS-REFERENCE TO RELATED APPLICATION

This application is based upon and claims the benefit of priority from Japanese Patent Application No. 2021-049569, filed Mar. 24, 2021, the entire contents of which are incorporated herein by reference.

FIELD

Embodiments described herein relate generally to a disk device.

BACKGROUND

A disk device such as a hard disk drive (HDD) includes, for example, a plurality of recording media, a plurality of magnetic heads, and a spoiler accommodated in a housing. The magnetic head reads and writes information from and to the recording medium.

Examples of related art include JP-A-2019-046524.

SUMMARY

In certain embodiments, a disk device comprises a plurality of recording media, each of the plurality of recording media having a recording surface. Each of the recording media are rotatable around a rotation axis which extends in an axial direction, the axial direction intersecting the recording surface. Each of the plurality of recording surfaces is aligned in the axial direction. The disk device further comprises a plurality of magnetic heads configured to read and write information from and to the plurality of recording media. The disk device additionally comprises a plurality of first blades attached to a common side surface. The plurality of first blades extends into a plurality of gaps that are positioned between the plurality of recording media. The further embodiments, the disk device comprises a housing provided with an inner chamber in which the plurality of recording media, the plurality of magnetic heads, and the plurality of first blades are accommodated. In certain embodiments, the number of first blades is smaller than the number of gaps.

In some embodiments, the plurality of recording media include a plurality of first recording media aligned in the axial direction, and at least one second recording medium separated from the plurality of first recording media in the axial direction. In such embodiments, each of the plurality of first recording media and the at least one second recording medium has an outer edge extending around the rotation axis. The common side surface to which the plurality of first blades is attached faces the outer edges of the plurality of first recording media, and the plurality of first blades are located in a plurality of first gaps of the plurality of gaps provided between the plurality of first recording media. In such embodiments, the plurality of first blades are located outside the second gap that is provided between the plurality of first recording media and the at least one second recording medium. In certain embodiments, the housing has a first inner peripheral surface aligned with the common side surface in the axial direction, the first inner peripheral surface extending around the rotation axis, and facing the outer edge of the at least one second recording medium.

In some embodiments, the plurality of recording media include a plurality of first recording media aligned in the axial direction, and at least one second recording medium separated from the plurality of first recording media in the axial direction. In certain embodiments, each of the plurality of first recording media and the at least one second recording medium has an outer edge extending around the rotation axis. In some embodiments, the common side surface extends around the rotation axis and faces the outer edges of the plurality of first recording media and the at least one second recording medium. In certain embodiments, the plurality of first blades are located in a plurality of first gaps of the plurality of gaps provided between the plurality of first recording media, and are located outside the second gap provided between the plurality of first recording media and the at least one second recording medium among the plurality of gaps.

In some embodiments, the plurality of recording media include a plurality of first recording media aligned in the axial direction, at least one second recording medium separated from the plurality of first recording media in the axial direction, and at least one third recording medium located between the the plurality of first recording media and the at least one second recording medium. In such embodiments, each of the plurality of first recording media, the at least one second recording medium, and the at least one third recording medium has an outer edge extending around the rotation axis. In some embodiments, the common side surface extends around the rotation axis and faces the outer edges of the plurality of first recording media and at least one third recording medium. In certain embodiments, the plurality of first blades are located in a plurality of first gaps of the plurality of gaps provided between the plurality of first recording media. In such embodiments, the plurality of first blades are located outside a third gap provided between the plurality of first recording media and the at least one third recording medium among the plurality of gaps, and are located outside a fourth gap provided between the at least one second recording medium and the at least one third recording medium. In certain embodiments, the housing has a first inner peripheral surface that is aligned with the common side surface in the axial direction and that extends around the rotation axis. The first inner peripheral surface faces the outer edge of the at least one second recording medium in some embodiments.

In some embodiments, the housing has a second inner peripheral surface extending around the rotation axis and facing the outer edges of the plurality of first recording media and the at least one second recording medium. In such embodiments, the first inner peripheral surface extends from the second inner peripheral surface around the rotation axis. In further embodiments, the housing includes a wall having the first inner peripheral surface and a shaft extending in the axial direction. In such embodiments, the wall has a support surface facing the axial direction and supporting the plurality of first blades. In some embodiments, the shaft is attached on the wall to protrude from the support surface, and the plurality of first blades is rotatably attached on the wall around the shaft by fitting the shaft into a hole extending in the axial direction.

In further embodiments, in the axial direction, a length of the first inner peripheral surface is larger than a length of one of the plurality of gaps. In still further embodiments, the number of recording media is 10 or more. In certain embodiments, the inner chamber is filled with one of a gas having a density lower than a density of air, an inert gas, or helium. In some embodiments, the disk device further comprises a board located outside the housing, the board being separated from the plurality of recording media in a radial direction orthogonal to the rotation axis.

In certain embodiments, the disk device further comprises an actuator configured to move the plurality of magnetic heads along the recording surface. In some embodiments, the disk device further comprises a flexible printed wiring board including an attachment portion attached to the housing and a flexible portion extending from the attachment portion. In some embodiments, the flexible portion extending from the attachment portion is connected to the actuator. In certain embodiments, the inner chamber includes a first chamber in which the plurality of recording media are accommodated and includes a second chamber in which the plurality of first blades and the attachment portion are accommodated. In some embodiments, the second chamber communicates with the first chamber. In further embodiments, the housing includes an end portion in the axial direction in which the first chamber and the second chamber are open, and further includes a first bottom surface of the first chamber in the axial direction facing the plurality of recording media. In some embodiments, the housing further includes a second bottom surface of the second chamber in the axial direction to which the attachment portion is attached. In certain embodiments, in the axial direction, a distance between the first bottom surface and the end portion is larger than a distance between the second bottom surface and the end portion.

In some embodiments, the disk device further comprises a cover which is attached to the housing and covers the inner chamber. In certain embodiments, the disk device further includes a second blade located between the cover and the plurality of recording media. In some embodiments, in the radial direction orthogonal to the rotation axis, lengths of the plurality of first blades are equal to each other, and a length of the second blade is smaller than a length of each of the plurality of first blades. In certain embodiments, the plurality of first blades forms a spoiler.

In some embodiments, a disk device comprises a housing and a plurality of recording media. Each of the plurality of recording media has a recording surface, and is rotatably supported in the housing. In some embodiments, a plurality of magnetic heads is configured to read and write information from and to the plurality of recording media, and a plurality of blades is provided between the plurality of recording media. In some embodiments, the number of recording media is n, and the number of blades is (n−2) or less.

DETAILED DESCRIPTION

For example, it may be difficult to provide blades in all the gaps between a plurality of recording media. Here, there is a concern that, for example, when a plurality of first blades forming a spoiler is omitted, the positioning accuracy of a magnetic head with respect to the recording medium may be decreased.

Embodiments provide a disk device capable of preventing a decrease in positioning accuracy of a magnetic head with respect to a recording medium.

In general, according to one embodiment, there is provided a disk device including a plurality of recording media, a plurality of magnetic heads, a plurality of first blades, and a housing. Each of the recording media has a recording surface, is rotatable around a rotation axis extending in the axial direction intersecting the recording surface, and is aligned in the axial direction. The magnetic head is configured to read and write information from and to the plurality of recording media. The plurality of first blades is located in a plurality of gaps provided between the plurality of recording media. The plurality of first blades forms a spoiler. The housing is provided with an inner chamber in which the plurality of recording media, the plurality of magnetic heads, and the spoiler are accommodated. The number of first blades is smaller than the number of gaps.

First Embodiment

Hereinafter, a first embodiment will be described with reference to FIGS. 1 to 5. It is noted that, in the present specification, the components according to the embodiment and the description of the components may be described in a plurality of expressions. The components and the description of the components are examples and are not limited by expressions of the present specification. The components may also be specified by names different from those in the present specification. The components may also be described by expressions different from the expressions of the present specification.

Figure 1:
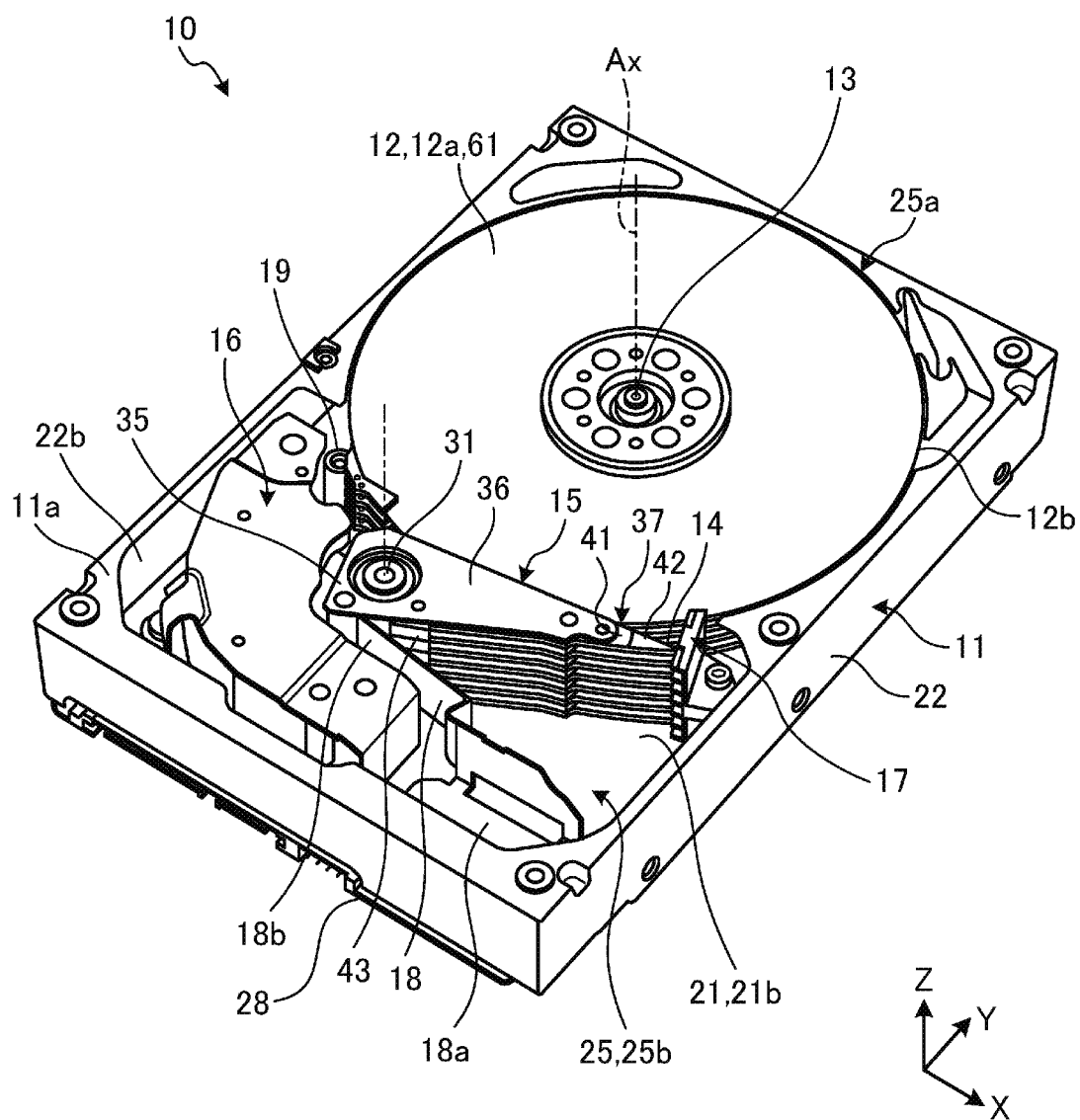
FIG. 1 is a perspective view illustrating a hard disk drive (HDD) according to a first embodiment.

FIG. 1 is a perspective view illustrating a hard disk drive (HDD) 10 according to the first embodiment. The HDD 10 is an example of a disk device and may also be referred to as an electronic device, a storage device, an external storage device, or a magnetic disk device.

As illustrated in each figure, an X axis, a Y axis, and a Z axis are defined for convenience in this specification. The X axis, the Y axis, and the Z axis are orthogonal to each other. The X axis is provided along a width of the HDD 10. The Y axis is provided along a length of the HDD 10. The Z axis is provided along a thickness of the HDD 10.

In the present specification, an X direction, a Y direction, and a Z direction are defined. The X direction is a direction along the X axis and includes a +X direction indicated by the arrow on the X axis and a −X direction which is the opposite direction of the arrow on the X axis. The Y direction is a direction along the Y axis and includes a +Y direction indicated by the arrow on the Y axis and a −Y direction which is the opposite direction of the arrow on the Y axis. The Z direction is a direction along the Z axis and includes a +Z direction indicated by the arrow on the Z axis and a −Z direction which is the opposite direction of the arrow on the Z axis.

As illustrated in FIG. 1, the HDD 10 includes a housing 11, a plurality of magnetic disks 12, a spindle motor 13, a plurality of magnetic heads 14, an actuator assembly 15, a voice coil motor (VCM) 16, a ramp load mechanism 17, a flexible printed wiring board (FPC) 18, and a plurality of first blades forming a spoiler 19. The magnetic disk 12 is an example of a recording medium. The magnetic head 14 may also be referred to as a slider. The actuator assembly 15 is an example of an actuator.

Figure 2:
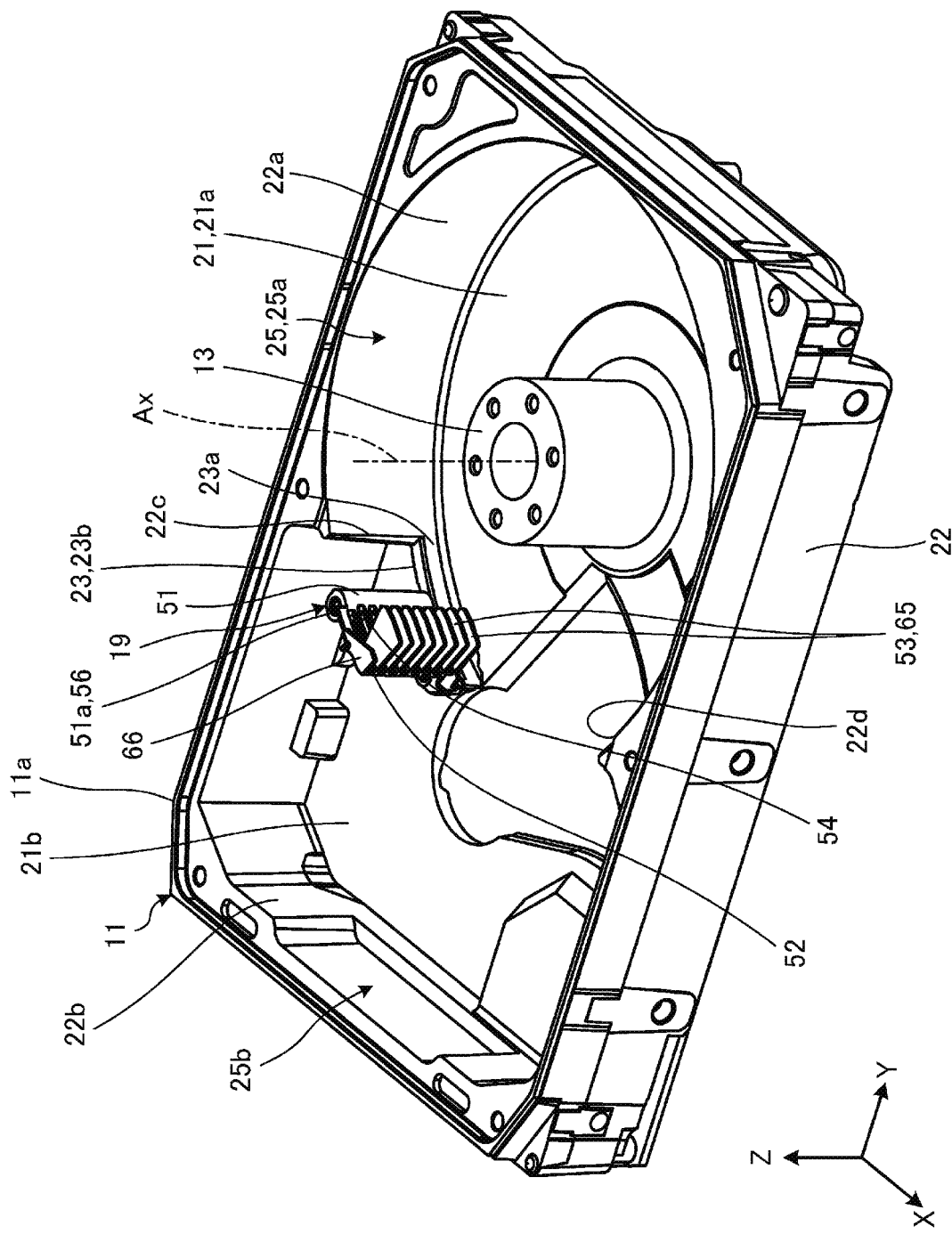
FIG. 2 is a perspective view illustrating a housing and a plurality of first blades of the first embodiment.

FIG. 2 is a perspective view illustrating the housing 11 and the spoiler 19 of the first embodiment. As illustrated in FIG. 2, the housing 11 extends in the Y direction and is formed in a rectangular parallelepiped box shape open in the +Z direction. The housing 11 has a bottom wall 21, a peripheral wall 22, and a middle wall 23. The middle wall 23 is an example of a wall.

The bottom wall 21 is formed in a substantially rectangular plate shape widening along an XY plane. The peripheral wall 22 protrudes from the edge of the bottom wall 21 in the substantially +Z direction and is formed in a substantially rectangular frame shape. The middle wall 23 protrudes from the bottom wall 21 in the substantially +Z direction and is continuous with the peripheral wall 22. The bottom wall 21, the peripheral wall 22, and the middle wall 23 are made of a metal material such as an aluminum alloy and are integrally formed.

An inner chamber 25 opened in an end portion 11a of the housing 11 in the +Z direction is provided inside the housing 11. The inner chamber 25 is formed (defined or partitioned) with, for example, the bottom wall 21 and the peripheral wall 22. The peripheral wall 22 surrounds the inner chamber 25. As illustrated in FIG. 1, the plurality of magnetic disks 12, the spindle motor 13, the plurality of magnetic heads 14, the actuator assembly 15, the VCM 16, the ramp load mechanism 17, the FPC 18, and the plurality of first blades forming spoiler 19 are accommodated in the inner chamber 25.

Figure 3:
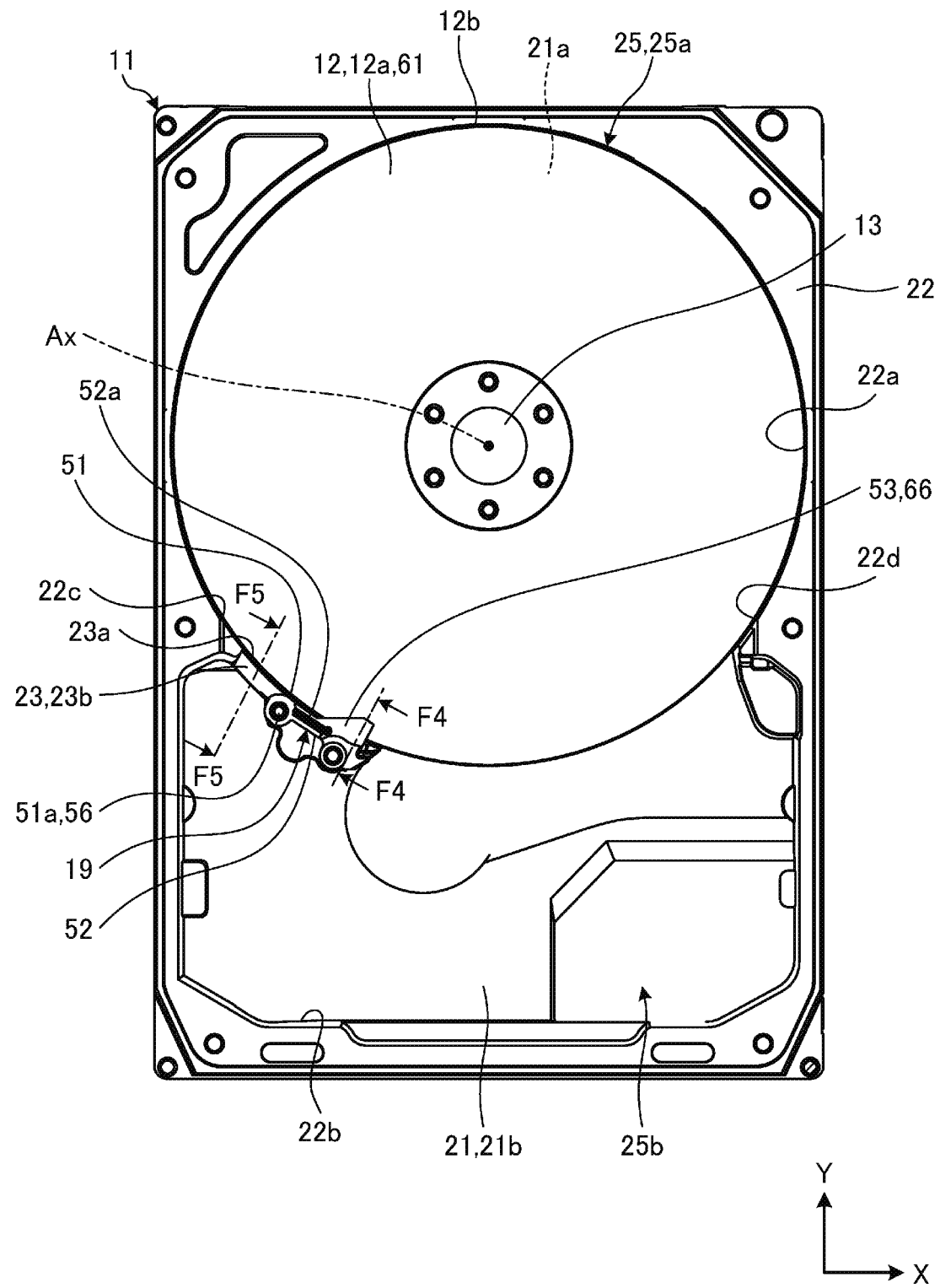
FIG. 3 is a plan view illustrating the housing, a magnetic disk, and the plurality of first blades of the first embodiment.
Figure 4:
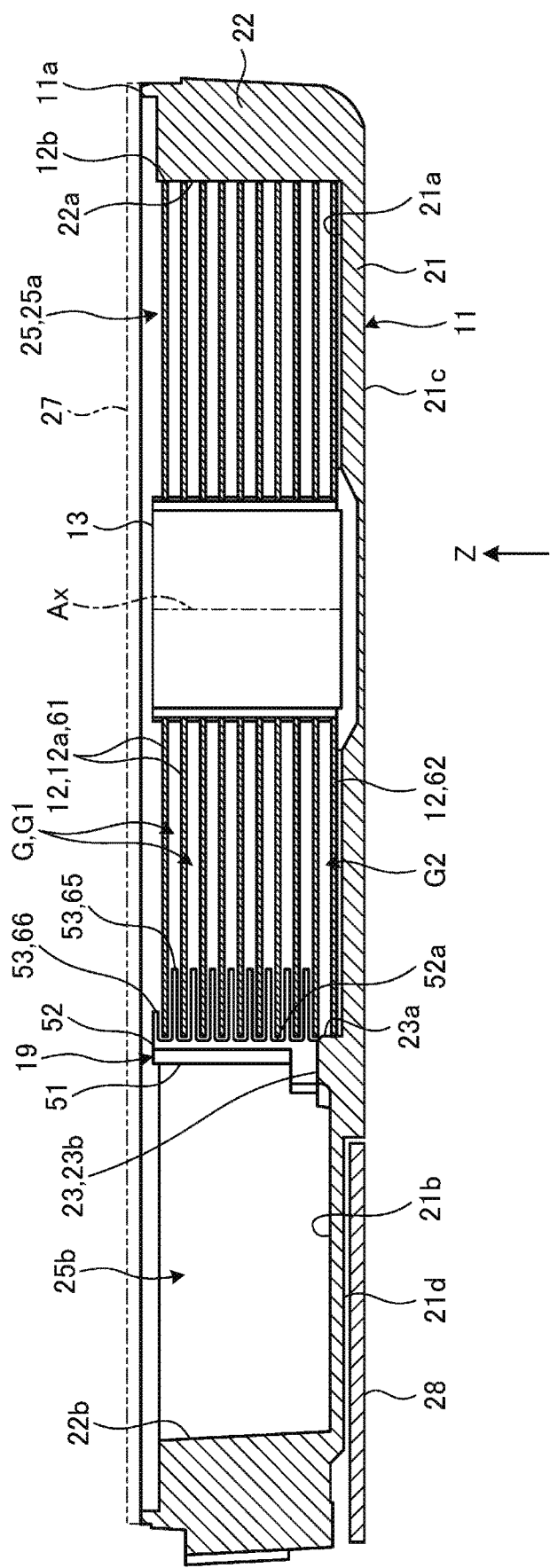
FIG. 4 is a cross-sectional view illustrating the housing, the magnetic disk, and the plurality of first blades of the first embodiment taken along line F4-F4 in FIG. 3.

FIG. 3 is a plan view illustrating the housing 11, the magnetic disk 12, and the plurality of first blades forming spoiler 19 of the first embodiment. FIG. 4 is a cross-sectional view illustrating the housing 11, magnetic disk 12, and plurality of first blades forming spoiler 19 of the first embodiment taken along line F4-F4 in FIG. 3. As illustrated in FIG. 4, the HDD 10 further includes a cover 27 and a printed circuit board (PCB) 28. The PCB 28 is an example of a board.

The cover 27 is made of, for example, an aluminum alloy in a substantially plate shape widening along the XY plane. It is noted that the cover 27 may be made of another material. The cover 27 is attached to the end portion 11a of the housing 11 by, for example, welding. Accordingly, the cover 27 covers the inner chamber 25.

The cover 27 of the present embodiment substantially air-tightly closes the inner chamber 25. The inner chamber 25 is filled with a gas different from air. For example, the inner chamber 25 is filled with a low-density gas having a density lower than that of air, an inert gas having a low reactivity, or the like. In the present embodiment, the inner chamber 25 is filled with helium. It is noted that the inner chamber 25 may be filled with another fluid. The inner chamber 25 may be maintained at a vacuum, a low pressure close to vacuum, or a negative pressure lower than the atmospheric pressure.

The PCB 28 is, for example, a rigid board such as a glass epoxy board, a multilayer board, a build-up board, or the like. The PCB 28 is located outside the housing 11 and is attached on the bottom wall 21 with, for example, screws.

For example, an interface connector for connecting to a host and a connector for connecting to the FPC 18 are mounted on the PCB 28. For example, a controller, various memories such as RAM, ROM, and a buffer memory, and other electronic components are further mounted on the PCB 28.

Each of the plurality of magnetic disks 12 illustrated in FIG. 1 is formed in a disk shape widening along the XY plane. A diameter of the magnetic disk 12 is, for example, 3.5 inches, but the diameter is not limited to the present example. Each of the plurality of magnetic disks 12 has, for example, at least one recording surface 12a and an outer edge 12b.

The recording surface 12a is provided on at least one of the upper surface and the lower surface of the magnetic disk 12. In other words, each of the plurality of recording surfaces 12a is a surface of the magnetic disk 12 facing in the substantially +Z direction or a surface of the magnetic disk 12 facing in the substantially −Z direction. The recording surface 12a is a substantially flat surface widening along the XY plane. A magnetic recording layer of the magnetic disk 12 is provided on the recording surface 12a. It is noted that the magnetic recording layer may not be provided on a portion of the recording surface 12a. The outer edge 12b is an outer peripheral surface of the magnetic disk 12.

As illustrated in FIG. 4, the plurality of magnetic disks 12 are stacked in the Z direction with an interval. Therefore, gaps G are provided between the plurality of magnetic disks 12. The spindle motor 13 includes a hub that supports the plurality of magnetic disks 12. The plurality of magnetic disks 12 are retained by, for example, a clamp spring on the hub of the spindle motor 13.

The spindle motor 13 rotates the plurality of magnetic disks 12 around the rotation axis Ax. The rotation axis Ax is a virtual axis as the center of rotation by the spindle motor 13 and is also a central axis of the hub of the magnetic disk 12 and the spindle motor 13. It is noted that the central axis of the disk-shaped magnetic disk 12 and the central axis of the hub of the spindle motor 13 may be deviated from the center of rotation by the spindle motor 13.

In the present specification, axial, radial, and circumferential directions are defined. The axial direction is a direction along the rotation axis Ax and includes one direction and the other direction along the rotation axis Ax. The radial direction is a direction orthogonal to the rotation axis Ax and includes a plurality of directions orthogonal to the rotation axis Ax. The circumferential direction is a direction that rotates around the rotation axis Ax and includes a direction that rotates clockwise and a direction that rotates counterclockwise around the rotation axis Ax.

The rotation axis Ax extends in the substantially Z direction. That is, in the present embodiment, the axial direction of the rotation axis Ax is substantially the Z direction and includes the +Z direction and the −Z direction. The axial direction of the rotation axis Ax is a direction orthogonal to (intersecting) the recording surface 12a. The magnetic disks 12 are rotatable around the rotation axis Ax extending in the axial direction and are aligned in the axial direction.

The outer edge 12b of the magnetic disk 12 is an end face of the magnetic disk 12 on the outer side in the radial direction of the rotation axis Ax and extends around the rotation axis Ax. In other words, the outer edge 12b extends in the circumferential direction of the rotation axis Ax. The outer edge 12b faces outward in the radial direction. The diameter of the outer edge 12b is substantially constant. It is noted that the center of the outer edge 12b may be deviated from the rotation axis Ax.

The magnetic head 14 illustrated in FIG. 1 performs recording and reproducing of information on the recording surface 12a of the magnetic disk 12. In other words, the magnetic head 14 reads and writes information from and to the magnetic disk 12. The magnetic head 14 is mounted on the actuator assembly 15.

The actuator assembly 15 is rotatably supported by a support axis 31 disposed at a position separated from the magnetic disk 12. The support axis 31 extends from the bottom wall 21 of the housing 11, for example, in the substantially +Z direction. That is, the support axis 31 extends substantially parallel to the rotation axis Ax.

The VCM 16 rotates the actuator assembly 15 to arrange the actuator assembly 15 at a desired position. When the magnetic head 14 moves to the outermost circumference of the magnetic disk 12 due to the rotation of the actuator assembly 15 by the VCM 16, the ramp load mechanism 17 retains the magnetic head 14 at a position separated from the magnetic disk 12.

The actuator assembly 15 includes an actuator block 35, a plurality of arms 36, and a plurality of head suspension assemblies 37. The head suspension assembly 37 may also be referred to as a head gimbal assembly (HGA).

The actuator block 35 is rotatably supported by the support axis 31 via, for example, a bearing. The plurality of arms 36 protrude from the actuator block 35 in a direction substantially orthogonal to the support axis 31. It is noted that the actuator assembly 15 may be divided, and the arm 36 may protrude from each of the plurality of actuator blocks 35.

The plurality of arms 36 are disposed at intervals in the axial direction. Each of the arms 36 is formed in a plate shape that can enter the gap G between the adjacent magnetic disks 12. The plurality of arms 36 extend substantially in parallel.

The actuator block 35 and the plurality of arms 36 are integrally made of, for example, an aluminum alloy. It is noted that the materials of the actuator block 35 and the arm 36 are not limited to the present example.

A voice coil of the VCM 16 is provided on a protrusion protruding from the actuator block 35 on the opposite side of the arm 36. The VCM 16 includes a pair of yokes, a voice coil disposed between the yokes, and a magnet provided on the yokes.

As described above, the VCM 16 rotates the actuator assembly 15. In other words, the VCM 16 integrally rotates (moves) the actuator block 35, the arm 36, and the head suspension assembly 37.

The head suspension assembly 37 is attached to a tip end portion of the corresponding arm 36 and protrudes from the arm 36. Accordingly, the plurality of head suspension assemblies 37 are arranged in the axial direction with an interval. Each of the plurality of head suspension assemblies 37 includes a base plate 41, a load beam 42, and a flexure 43.

The base plate 41 and the load beam 42 are made of, for example, stainless steel. It is noted that the materials of the base plate 41 and the load beam 42 are not limited to the present example. The base plate 41 is formed in a plate shape and is attached to the tip end portion of the arm 36. The load beam 42 is attached to the tip end portion of the base plate 41 and protrudes from the base plate 41.

The flexure 43 is formed in an elongated strip shape. It is noted that the shape of the flexure 43 is not limited to this example. The flexure 43 is a stacked board including a metal plate (backing layer) of a stainless steel or the like, an insulating layer formed on the metal plate, a conductive layer formed on the insulating layer and configuring a plurality of wirings (wiring patterns), and a protective layer (insulating layer) covering the conductive layer.

The flexure 43 is attached to the base plate 41 and the load beam 42. One end portion of the flexure 43 includes a gimbal portion (elastic support portion) that is located above the load beam 42 and is displaceable. The magnetic head 14 is mounted on the gimbal portion. The flexure 43 is electrically connected to the magnetic head 14.

When the VCM 16 rotates the actuator assembly 15, the magnetic head 14 mounted on the gimbal portion of the actuator assembly 15 also moves around the support axis 31. Accordingly, the actuator assembly 15 and the VCM 16 move the magnetic head 14 along the recording surface 12a of the magnetic disk 12.

The FPC 18 includes an attachment portion 18a and a flexible portion 18b. The attachment portion 18a is provided at one end portion of the FPC 18. The attachment portion 18a is attached on the bottom wall 21 of the housing 11 with, for example, a screw. The flexible portion 18b is formed in a substantially band shape and extends from the attachment portion 18a. The end portion of the flexible portion 18b is attached to the actuator block 35 of the actuator assembly 15 with, for example, a screw.

The attachment portion 18a is electrically connected to the connector of the PCB 28 via, for example, a connector provided on the bottom wall 21. The flexible portion 18b is connected to the flexure 43 of the actuator assembly 15. Accordingly, the FPC 18 is electrically connected to the magnetic head 14 via the flexure 43.

Hereinafter, the structure of the HDD 10 of the present embodiment will be described in detail. As illustrated in FIG. 2, the inner chamber 25 includes a first chamber 25a and a second chamber 25b. The first chamber 25a is, for example, a substantially columnar portion of the inner chamber 25 centered on the rotation axis Ax. The second chamber 25b is a portion of the inner chamber 25 excluding the first chamber 25a. It is noted that the inner chamber 25 is not limited to the present example.

The first chamber 25a and the second chamber 25b are aligned in the Y direction and communicate with each other. For example, the second chamber 25b is separated from the rotation axis Ax, which is the center of the first chamber 25a, in the −Y direction. The end portion of the second chamber 25b in the +Y direction communicates with the end portion of the first chamber 25a in the −Y direction. Both the first chamber 25a and the second chamber 25b are open in the end portion 11a of the housing 11.

As illustrated in FIG. 1, the plurality of magnetic disks 12 and the spindle motor 13 are accommodated in the first chamber 25a. The VCM 16, the ramp load mechanism 17, the FPC 18 including the attachment portion 18a and the flexible portion 18b, and the plurality of first blades forming spoiler 19 are accommodated in the second chamber 25b. For example, the magnetic head 14 and the actuator assembly 15 can move across the first chamber 25a and the second chamber 25b.

As illustrated in FIG. 3, the peripheral wall 22 of the housing 11 has an inner peripheral surface 22a and an inner surface 22b. The inner peripheral surface 22a is an example of a second inner peripheral surface. The inner peripheral surface 22a and the inner surface 22b are continuous with each other and face the inner chamber 25.

The inner peripheral surface 22a is an arc-shaped curved surface extending around the rotation axis Ax. Therefore, the inner peripheral surface 22a is substantially concentric (coaxial) with the outer edge 12b of the magnetic disk 12. It is noted that the center of the inner peripheral surface 22a may be deviated from the rotation axis Ax.

The inner peripheral surface 22a is interrupted at substantially the center of the housing 11 in the Y direction and is formed substantially in a C shape. Therefore, the inner peripheral surface 22a has two ends 22c and 22d in the circumferential direction. The inner surface 22b is connected to the ends 22c and 22d of the inner peripheral surface 22a.

Figure 5:
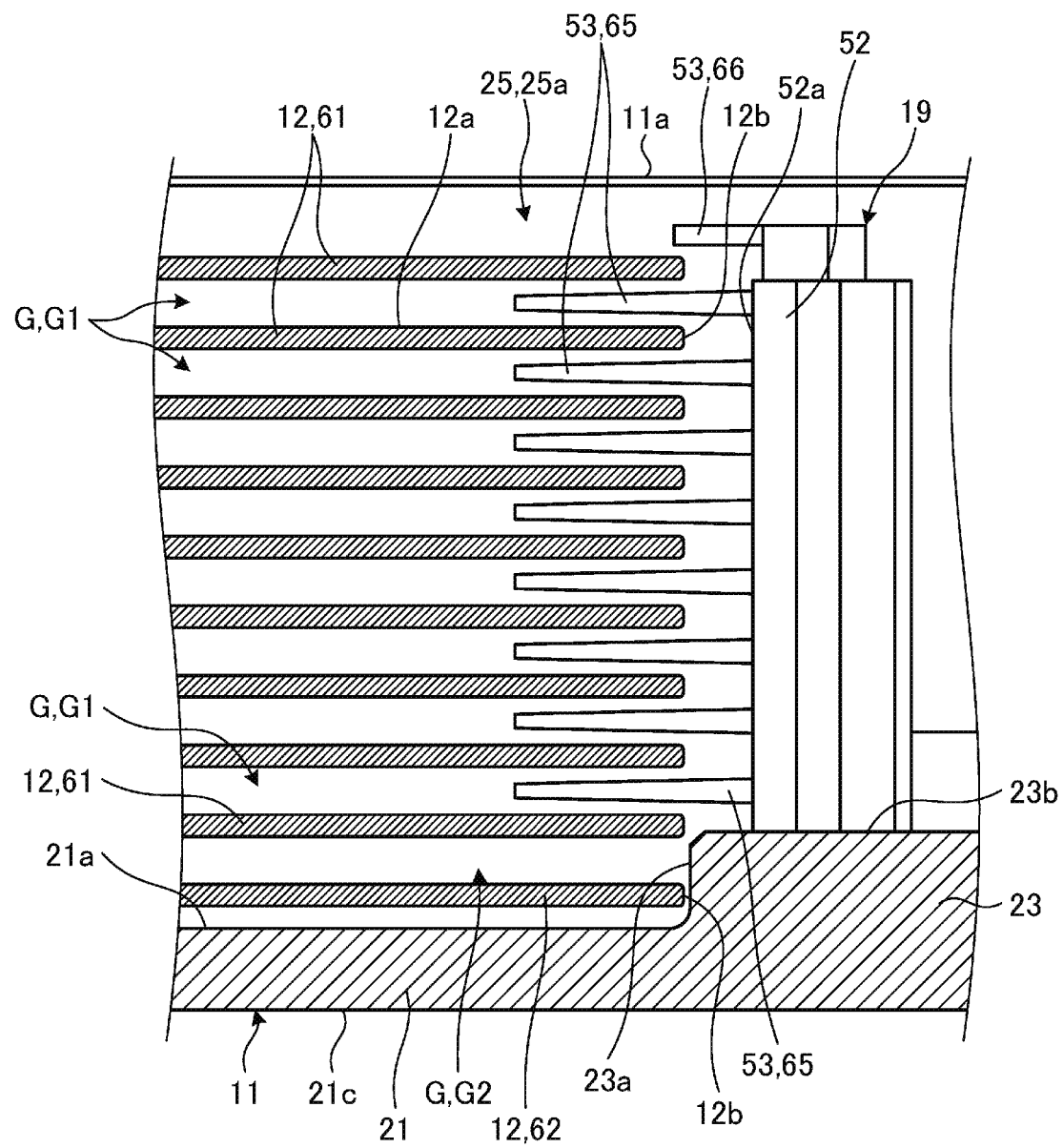
FIG. 5 is a cross-sectional view illustrating the housing, the magnetic disk, and the plurality of first blades of the first embodiment taken along line F5-F5 in FIG. 3.

FIG. 5 is a cross-sectional view illustrating the housing 11, the magnetic disk 12, and the plurality of first blades forming spoiler 19 of the first embodiment taken along line F5-F5 in FIG. 3. As illustrated in FIG. 5, the middle wall 23 of the housing 11 has an inner peripheral surface 23a and a support surface 23b. The inner peripheral surface 23a is an example of a first inner peripheral surface.

The inner peripheral surface 23a is an arc-shaped curved surface extending around the rotation axis Ax. Therefore, the inner peripheral surface 23a is substantially concentric (coaxial) with the outer edge 12b of the magnetic disk 12 and the inner peripheral surface 22a of the peripheral wall 22. It is noted that the center of the inner peripheral surface 23a may be deviated from the rotation axis Ax.

As illustrated in FIG. 2, the diameter of the inner peripheral surface 23a of the middle wall 23 is substantially equal to the diameter of the inner peripheral surface 22a of the peripheral wall 22. The inner peripheral surface 23a of the middle wall 23 extends continuously from the end 22c of the inner peripheral surface 22a of the peripheral wall 22. In other words, the inner peripheral surface 23a extends from the inner peripheral surface 22a around the rotation axis Ax.

The length of the inner peripheral surface 23a of the middle wall 23 in the Z direction is smaller than the length of the inner peripheral surface 22a of the peripheral wall 22 in the Z direction. Therefore, a portion of the inner peripheral surface 22a of the peripheral wall 22 is interrupted in the end 22c, and the other portion of the inner peripheral surface 22a is continuous with the inner peripheral surface 23a of the middle wall 23.

The support surface 23b is provided at the end of the middle wall 23 in the +Z direction. The support surface 23b is formed to be substantially flat and faces the +Z direction (axial direction). It is noted that the support surface 23b is not limited to the present example. The support surface 23b is closer to the end portion 11a of the housing 11 than the bottom wall 21. It is noted that the bottom wall 21 may have a portion closer to the end portion 11a than the support surface 23b.

As illustrated in FIG. 4, the bottom wall 21 has a first bottom surface 21a, a second bottom surface 21b, a first outer surface 21c, and a second outer surface 21d. The first bottom surface 21a and the second bottom surface 21b face the inside of the housing 11. The first outer surface 21c and the second outer surface 21d face the outside of the housing 11.

The first bottom surface 21a is the bottom surface of the first chamber 25a in the Z direction. The first bottom surface 21a is formed in a substantially flat, substantially annular shape and faces in the +Z direction. The second bottom surface 21b is the bottom surface of the second chamber 25b in the Z direction. It is noted that the first bottom surface 21a and the second bottom surface 21b may be provided with irregularities.

The first bottom surface 21a faces the magnetic disk 12 accommodated in the first chamber 25a. The attachment portion 18a of the FPC 18 is attached on the second bottom surface 21b via, for example, a boss or a spacer. A connector connected to the FPC 18 is provided on the second bottom surface 21b.

In the axial direction, the distance between the first bottom surface 21a and the end portion 11a of the housing 11 is larger than the distance between the second bottom surface 21b and the end portion 11a of the housing 11. That is, the first chamber 25a is recessed deeper from the end portion 11a of the housing 11 than the second chamber 25b.

The first outer surface 21c is located on the opposite side of the first bottom surface 21a. The second outer surface 21d is located on the opposite side of the second bottom surface 21b. The second outer surface 21d is recessed in the +Z direction for example, from the first outer surface 21c. Therefore, the second outer surface 21d is closer to the end portion 11a of the housing 11 than the first outer surface 21c.

The first bottom surface 21a of the bottom wall 21, the inner peripheral surface 22a of the peripheral wall 22, the inner peripheral surface 23a of the middle wall 23, and the cover 27 form (define or partition) the first chamber 25a of the inner chamber 25. Therefore, the first chamber 25a is surrounded by the inner peripheral surfaces 22a and 23a.

The second bottom surface 21b of the bottom wall 21, the inner surface 22b of the peripheral wall 22, and the cover 27 form (define or partition) the second chamber 25b of the inner chamber 25. Therefore, the second chamber 25b is surrounded by the inner surface 22b.

The PCB 28 covers the second outer surface 21d of the bottom wall 21. In the radial direction, the PCB 28 is separated from the first outer surface 21c of the bottom wall 21. The PCB 28 is accommodated in a portion of the housing 11 that is recessed in the +Z direction from the first outer surface 21c. Therefore, the PCB 28 is separated from the plurality of magnetic disks 12 in the radial direction. In other words, in the plan view seen in the axial direction, the PCB 28 is disposed at a position deviated from the magnetic disk 12.

As illustrated in FIG. 2, the plurality of first blades forming spoiler 19 includes a cylinder portion 51, a wall portion 52, a plurality of blades (fins) 53, and a plurality of filters 54. The cylinder portion 51, the wall portion 52, and the blades 53 integrally form. In some embodiments, the cylinder portion 51 and the wall portion 52 form a common side surface to which the plurality of first blades 53 are attached The cylinder portion 51 is attached on the middle wall 23 of the housing 11. For example, the housing 11 further includes an attachment shaft 56 for attaching the cylinder portion 51. The attachment shaft 56 is an example of a shaft. The attachment shaft 56 is attached on the middle wall 23 to protrude from the support surface 23b and extend in the axial direction. For example, the end portion of the attachment shaft 56 is inserted into a hole that opens in the support surface 23b. The length (height) of the middle wall 23 in the axial direction is set so that the inner surface of the hole can hold the attachment shaft 56.

The cylinder portion 51 is formed in a substantially cylindrical shape extending in the axial direction. Accordingly, a hole 51a extending in the axial direction is provided inside the cylinder portion 51. By fitting the attachment shaft 56 into the hole 51a, the cylinder portion 51 is attached on the middle wall 23 rotatably around the attachment shaft 56. It is noted that the plurality of first blades forming spoiler 19 is not limited to the present example, and the plurality of first blades forming a spoiler may be attached to the housing 11 by other means such as an adhesive.

The wall portion 52 extends from the cylinder portion 51 around the rotation axis Ax. In the axial direction, the wall portion 52 is located between the support surface 23b of the middle wall 23 and the cover 27. The cylinder portion 51 and the wall portion 52 are supported by the support surface 23b of the middle wall 23. Accordingly, the support surface 23b supports the plurality of first blades forming spoiler 19. The wall portion 52 is adjacent to the plurality of magnetic disks 12 via a gap in the radial direction of the rotation axis Ax.

As illustrated in FIG. 5, the wall portion 52 has an inner peripheral surface 52a. The inner peripheral surface 52a is an example of a side surface. The inner peripheral surface 52a is an arc-shaped curved surface extending around the rotation axis Ax. Therefore, the inner peripheral surface 52a is substantially concentric (coaxial) with the outer edge 12b of the magnetic disk 12, the inner peripheral surface 22a of the peripheral wall 22, and the inner peripheral surface 23a of the middle wall 23. It is noted that the center of the inner peripheral surface 52a may be deviated from the rotation axis Ax. The inner peripheral surface 52a may be formed in another shape.

As illustrated in FIG. 3, the diameter of the inner peripheral surface 52a of the wall portion 52 is substantially equal to the diameter of the inner peripheral surface 22a of the peripheral wall 22. As illustrated in FIG. 4, the diameter of the inner peripheral surface 52a of the wall portion 52 is substantially equal to the diameter of the inner peripheral surface 23a of the middle wall 23. It is noted that the diameter of the inner peripheral surfaces 52a and the diameters of the inner peripheral surfaces 22a and 23a may be different from each other. The diameters of the peripheral walls 22, the middle wall 23, and the inner peripheral surfaces 22a, 23a, and 52a of the wall portion 52 are slightly larger than the diameters of the outer edges 12b of the plurality of magnetic disks 12.

The inner peripheral surface 23a of the middle wall 23 is aligned with the inner peripheral surface 52a of the wall portion 52 in the axial direction of the rotation axis Ax. As illustrated in FIG. 3, the inner peripheral surface 22a of the peripheral wall 22 is aligned with the inner peripheral surface 52a of the wall portion 52 in the circumferential direction of the rotation axis Ax with an interval. It is noted that the inner peripheral surfaces 22a and 52a may be adjacent to each other without a gap.

As illustrated in FIG. 5, the plurality of blades 53 protrude from the inner peripheral surface 52a of the wall portion 52, which is one example of a common side surface. The plurality of blades 53 are aligned in the axial direction of the rotation axis Ax with an interval. The interval between the plurality of blades 53 in the axial direction is substantially equal to the interval between the plurality of magnetic disks 12 in the axial direction.

Each of the plurality of blades 53 is formed in a substantially plate shape widening along an XY plane, for example. The blade 53 and the magnetic disk 12 are arranged substantially in parallel. It is noted that the blade 53 is not limited to the present example.

The plurality of filters 54 illustrated in FIG. 2 are provided on the inner peripheral surface 52a of the wall portion 52. The plurality of filters 54 are located between the plurality of blades 53 in the axial direction of the rotation axis Ax. The filter 54 recovers, for example, dust in the inner chamber 25.

As illustrated in FIG. 5, the HDD 10 of the present embodiment includes, for example, ten magnetic disks 12 and nine blades 53. It is noted that the HDD 10 is not limited to the present example, and may include more than ten magnetic disks 12 or less than ten magnetic disks 12. The HDD 10 may include more than nine blades 53 or less than nine blades 53.

In the present embodiment, the ten magnetic disks 12 include nine first magnetic disks 61 and one second magnetic disk 62. The first magnetic disk 61 is an example of a plurality of first recording media. The second magnetic disk 62 is an example of a second recording medium.

The second magnetic disk 62 is one of the ten magnetic disks 12. The first magnetic disks 61 are the remnants of the magnetic disk 12. It is noted that the magnetic disk 12 may include a plurality of second magnetic disks 62.

The nine first magnetic disks 61 are aligned in the axial direction of the rotation axis Ax with an interval. The second magnetic disk 62 is separated from the plurality of first magnetic disks 61 in the −Z direction. In other words, the second magnetic disk 62 is separated from the plurality of first magnetic disks 61 in the axial direction. It is noted that, when the magnetic disk 12 includes the plurality of second magnetic disks 62, the plurality of second magnetic disks 62 are also aligned in the axial direction with an interval.

The second magnetic disk 62 is located between the plurality of first magnetic disks 61 and the bottom wall 21. That is, the second magnetic disk 62 includes one of the plurality of magnetic disks 12 closest to the bottom wall 21.

The first magnetic disk 61 and the second magnetic disk 62 are the same magnetic disks 12 as each other. Therefore, each of the first magnetic disk 61 and the second magnetic disk 62 has the recording surface 12a and the outer edge 12b. It is noted that the first magnetic disk 61 and the second magnetic disk 62 may be different from each other.

In the present embodiment, nine gaps G are provided between the ten magnetic disks 12. The nine gaps G include eight first gaps G1 and one second gap G2. The first gap G1 is a gap provided between the nine first magnetic disks 61 among a plurality of gaps G The second gap G2 is a gap provided between one of the plurality of first magnetic disks 61 closest to the bottom wall 21 and the second magnetic disk 62 among the plurality of gaps G.

In the axial direction of the rotation axis Ax, the length (width) of each of the plurality of first gaps G1 and the length (width) of the second gap G2 are substantially equal to each other. The distance between the second magnetic disk 62 and the bottom wall 21 is smaller than the length of each of the first gap G1 and the second gap G2.

As illustrated in FIG. 4, the inner peripheral surface 22a of the peripheral wall 22 faces the outer edges 12b of the plurality of magnetic disks 12. In other words, the inner peripheral surface 22a faces the outer edge 12b of the nine first magnetic disks 61 and the outer edge 12b of the one second magnetic disk 62. The inner peripheral surface 22a covers the outer edges 12b of the plurality of magnetic disks 12 from the outside in the radial direction of the rotation axis Ax. In other words, the inner peripheral surface 22a extends along the outer edge 12b of the plurality of magnetic disks 12 while being separated from the outer edge 12b with a slight distance.

The inner peripheral surface 22a of the peripheral wall 22 functions as a so-called shroud. Therefore, the inner peripheral surface 22a prevents the turbulent flow of helium gas from occurring by regulating the flow of helium gas in the inner chamber 25 in the vicinity of the first magnetic disk 61 and the second magnetic disk 62. The distances between the inner peripheral surface 22a and the outer edges 12b of the first magnetic disk 61 and the second magnetic disk 62 are set so that the inner peripheral surface 22a can prevent the turbulent flow from occurring.

As illustrated in FIG. 5, the inner peripheral surface 23*a* of the middle wall 23 faces the outer edge 12*b* of one second magnetic disk 62 and the second gap G2. The inner peripheral surface 23*a* covers the outer edge 12*b* of the second magnetic disk 62 from the outside in the radial direction of the rotation axis Ax. In other words, the inner peripheral surface 23*a* extends along the outer edge 12*b* of the second magnetic disk 62 while being separated from the outer edge 12*b* with a slight distance. On the other hand, in the axial direction of the rotation axis Ax, the inner peripheral surface 23*a* is separated from the outer edge 12*b* of the nine first magnetic disks 61 and the first gap G1.

The inner peripheral surface 23*a* of the middle wall 23 functions as a shroud. Therefore, the inner peripheral surface 23*a* prevents the turbulent flow of helium gas from occurring by regulating the flow of helium gas in the inner chamber 25 in the vicinity of the second magnetic disk 62. The distance between the inner peripheral surface 23*a* and the outer edge 12*b* of the second magnetic disk 62 is set so that the inner peripheral surface 23*a* can prevent the turbulent flow from occurring.

In the axial direction of the rotation axis Ax, the length of the inner peripheral surface 23*a* of the middle wall 23 is larger than the length (width) of one of the plurality of gaps G In the present embodiment, the length of the inner peripheral surface 23*a* in the axial direction is larger than the sum of the width of one of the plurality of gaps G and the length (thickness) of one of the plurality of magnetic disks 12.

The inner peripheral surface 52*a* of the wall portion 52 faces the outer edges 12*b* of the nine first magnetic disks 61 and the first gap G1. The inner peripheral surface 52*a* covers the outer edge 12*b* of the first magnetic disk 61 from the outside in the radial direction of the rotation axis Ax. In other words, the inner peripheral surface 52*a* extends along the outer edge 12*b* of the first magnetic disk 61 while being separated from the outer edge 12*b* with a slight distance. On the other hand, in the axial direction of the rotation axis Ax, the inner peripheral surface 52*a* is separated from the outer edge 12*b* of one second magnetic disk 62 and the second gap G2.

The inner peripheral surface 52*a* of the wall portion 52 functions as a shroud. Therefore, the inner peripheral surface 52*a* prevents the turbulent flow of helium gas from occurring by regulating the flow of helium gas in the inner chamber 25 in the vicinity of the first magnetic disk 61. The distance between the inner peripheral surface 52*a* and the outer edge 12*b* of the first magnetic disk 61 is set so that the inner peripheral surface 22*a* can prevent the turbulent flow from occurring.

In the present embodiment, the nine blades 53 include eight first blades 65 and one second blade 66. In other words, the first blades 65 and the second blade 66 form spoiler 19. The first blades 65 are examples of the first blades and the blade.

The second blade 66 is one of the nine blades 53. The first blades 65 are the remnants of the blades 53. Both the first blades 65 and the second blade 66 protrude from the inner peripheral surface 52*a* of the wall portion 52. It is noted that, as for the blade 53, the second blade 66 may be omitted.

The eight first blades 65 are aligned in the axial direction of the rotation axis Ax with an interval. The second blade 66 is separated from the plurality of first blades 65 in the +Z direction. In other words, the second blade 66 is separated from the plurality of first blades 65 in the axial direction.

The eight first blades 65 are located in the eight first gaps G1 out of the nine gaps G In other words, the corresponding one of the eight first blades 65 is located in each of the eight first gaps G1. As described above, the plurality of first blades 65 are located in the plurality of gaps G On the other hand, the eight first blades 65 do not enter the second gap G2 and are located outside the second gap G2.

The shapes of the eight first blades 65 are substantially equal to each other. Therefore, the lengths of the first blades 65 in the radial direction of the rotation axis Ax are substantially equal to each other. It is noted that the shapes of the first blades 65 may be different from each other.

As illustrated in FIG. 4, the second blade 66 is located between the cover 27 and the plurality of magnetic disks 12. On the other hand, the second blade 66 does not enter the gap G between the plurality of magnetic disks 12 but is located outside the gap G In the radial direction of the rotation axis Ax, the length of the second blade 66 is smaller than the length of each of the plurality of first blades 65. It is noted that the shape of the second blade 66 is not limited to the present example.

As described above, the first blade 65 enters the first gap G1 of the gaps G and does not enter the second gap G2. The second blade 66 does not enter any of the plurality of gaps G Therefore, the number of blades 53 that enter the gap that is, the number of first blades 65 (8 blades) is smaller than the number of gaps G (9 gaps). In other words, the number (8 blades) of the first blades 65 is equal to or smaller than the number that is subtracted 2 from the number of the plurality of magnetic disks 12 (10 blades)(that is, 10−2).

As described above, the number of the magnetic disks 12 is 10, and the number of the first blades 65 provided between the magnetic disks 12 is 8. That is, when it is assumed that the number of magnetic disks 12 is n, the number of the first blades 65 is (n−2) or less. It is noted that the (n−2) is the number of first blades 65 provided between the magnetic disks 12, the number of second blades 66 located outside the plurality of magnetic disks 12 is not included.

The first blade 65 prevents the turbulent flow of helium gas from occurring by being located in the first gap G1, by regulating the flow of helium gas in the inner chamber 25 in the first gap G1. Accordingly, the first blade 65 can prevent the disk flutter where the first magnetic disk 61 is shaken. The first blade 65 can prevent the flow of helium gas from hitting the magnetic head 14 located in the first gap G1. Accordingly, the first blade 65 can improve the positioning accuracy of the magnetic head 14 with respect to the first magnetic disk 61.

On the other hand, none of the plurality of blades 53 is disposed in the second gap G2 adjacent to the second magnetic disk 62. However, the inner peripheral surface 23*a* of the middle wall 23 as a shroud covers the outer edge 12*b* of the second magnetic disk 62 from the radial outside of the rotation axis Ax. Accordingly, the inner peripheral surface 23*a* regulates the flow of helium gas around the second magnetic disk 62 and prevents the turbulent flow of the helium gas from occurring. Accordingly, the inner peripheral surface 23*a* can prevent the disk flutter where the second magnetic disk 62 is shaken and can improve the positioning accuracy of the magnetic head 14 with respect to the second magnetic disk 62.

In some cases, in the inner chamber 25 filled with helium gas, the effect of improving the positioning accuracy of the magnetic head 14 by the inner peripheral surface 23*a* (shroud) is higher than the effect of improving the positioning accuracy of the magnetic head 14 by the first blade 65. Therefore, the HDD 10 of the present embodiment can improve the positioning accuracy of the magnetic head 14 with respect to all the magnetic disks 12 while omitting the disposing of the blades 53 in the second gap G2.

In the present embodiment, the plurality of blades forming spoiler 19 is attached, for example, to the housing 11 as follows. First, the attachment shaft 56 is inserted into the hole 51a of the cylinder portion 51 of the plurality of blades forming spoiler 19, and the cylinder portion 51 is supported by the support surface 23b of the middle wall 23. Here, the plurality of blades 53 are located outside the gap G Next, by allowing the plurality of first blades forming spoiler 19 to rotate around the attachment shaft 56, the plurality of first blades 65 are inserted into the plurality of first gaps G1. Accordingly, the first blade 65 is disposed in the first gap G1, and the wall portion 52 is supported by the support surface 23b of the middle wall 23. Here, the plurality of blades forming spoiler 19 is fixed to the housing 11 with, for example, a screw. It is noted that the plurality of blades forming spoiler 19 may be attached to the housing 11 by other methods.

In the HDD 10 according to the first embodiment described above, the plurality of blades forming spoiler 19 includes the plurality of first blades 65 located in the plurality of gaps G provided between the plurality of magnetic disks 12. The flow of fluid (helium gas) in the inner chamber 25 occurs by the rotation of the magnetic disk 12. The first blade 65 of the plurality of blades that form spoiler 19 can prevent a turbulent flow in the gap G between the plurality of magnetic disks 12 from occurring and can prevent the disk flutter where the magnetic disk 12 is shaken. The first blade 65 can prevent the flow of the fluid from hitting the magnetic head 14 located between the plurality of magnetic disks 12. Accordingly, the first blade 65 can improve the positioning accuracy of the magnetic head 14 with respect to the magnetic disk 12. On the other hand, for example, when the number of magnetic disks 12 is large, the number of first blades 65 is also increased, and the length of the plurality of blades forming spoiler 19 is also increased in the axial direction. However, the dimensions of the HDD 10 in the axial direction may be constrained by, for example, a standard. Therefore, when the number of magnetic disks 12 is large, it may be difficult to provide the first blades 65 in all the gaps G depending on the structures of the plurality of blades forming spoiler 19 and the housing 11. For example, to support the attachment shaft 56, the middle wall 23 has a predetermined length in the axial direction. Therefore, the inner peripheral surface 52a of the plurality of blades forming spoiler 19 is separated from the second gap G2, and it is difficult for the first blade 65 protruding from the inner peripheral surface 52a to be disposed in the second gap G2. On the other hand, in the HDD 10 of the present embodiment, the number of first blades 65 is smaller than the number of gaps G That is, no first blade 65 is disposed in at least one of the plurality of gaps G However, the first blade 65 is disposed in the remnants of the plurality of gaps G Therefore, the HDD 10 can improve the positioning accuracy of the magnetic head 14 with respect to the desired first magnetic disk 61 among the plurality of magnetic disks 12 by the first blade 65 without significantly changing the structures of the plurality of blades forming spoiler 19 and the housing 11. On the other hand, the HDD 10 can improve the positioning accuracy of the magnetic head 14 with respect to the second magnetic disk 62 by a different structure.

The plurality of blades forming spoiler 19 has the inner peripheral surface 52a facing the outer edge 12b of the plurality of first magnetic disks 61. The plurality of first blades 65 protrude from the inner peripheral surface 52a and are located in the plurality of first gaps G1 provided between the plurality of first magnetic disks 61 among the plurality of gaps G and located outside the second gap G2 provided between the plurality of first magnetic disks 61 and at least one second magnetic disk 62 among the plurality of gap G The housing 11 has the inner peripheral surface 23a being aligned with the inner peripheral surface 52a in the axial direction, extending around the rotation axis Ax, and facing the outer edge 12b of at least one second magnetic disk 62. That is, the first blade 65 is disposed in the plurality of first gaps G1, and no first blade 65 is disposed in the second gap G2. The plurality of first blades 65 can improve the positioning accuracy of the magnetic head 14 with respect to the plurality of first magnetic disks 61 by locating the plurality of first blades 65 in the plurality of first gaps G1. On the other hand, the inner peripheral surface 23a extending around the rotation axis Ax faces the second magnetic disk 62. That is, the inner peripheral surface 23a is an arc-shaped curved surface substantially concentric with the outer edge 12b of the second magnetic disk 62 and covers the outer edge 12b of the second magnetic disk 62. Therefore, the inner peripheral surface 23a functions as a so-called shroud to regulate the flow of fluid in the vicinity of the second magnetic disk 62 and prevents the turbulent flow from occurring. Accordingly, the inner peripheral surface 23a can prevent the disk flutter of the second magnetic disk 62. Therefore, the inner peripheral surface 23a can improve the positioning accuracy of the magnetic head 14 with respect to the second magnetic disk 62. As described above, the HDD 10 of the present embodiment can improve the positioning accuracy of the magnetic head 14 with respect to the second magnetic disk 62 without providing the first blade 65 in the second gap G2.

The housing 11 has the inner peripheral surface 22a extending around the rotation axis Ax and facing the outer edge 12b of the plurality of first magnetic disks 61 and at least one second magnetic disk 62. The inner peripheral surface 23a extends from the inner peripheral surface 22a around the rotation axis Ax. That is, the inner peripheral surface 23a facing the second magnetic disk 62 and the inner peripheral surface 22a facing both the first magnetic disk 61 and the second magnetic disk 62 are continuous with each other without interruption. Accordingly, the inner peripheral surface 23a and the inner peripheral surface 22a can more effectively prevent the flow of the fluid from be turbulent in the vicinity of the second magnetic disk 62.

The housing 11 includes the middle wall 23 having the inner peripheral surface 23a and the attachment shaft 56 extending in the axial direction. The middle wall 23 has the support surface 23b that faces in the axial direction and supports the spoiler 19. The attachment shaft 56 is attached on the middle wall 23 to protrude from the support surface 23b. The plurality of first blades forming spoiler 19 is provided with the hole 51a extending in the axial direction, and by fitting the attachment shaft 56 into the hole 51a, the plurality of first blades forming spoiler 19 is attached on the middle wall 23 rotatably around the attachment shaft 56. Accordingly, by rotating around the attachment shaft 56, the plurality of first blades forming spoiler 19 can easily be inserted into the plurality of gaps G Since the middle wall 23 has a thickness for forming the inner peripheral surface 23a, the attachment shaft 56 can be reliably supported.

In the axial direction, the length of the inner peripheral surface 23a is larger than the length of one of the plurality of gaps G Accordingly, the inner peripheral surface 23a can face the outer edge 12b of the second magnetic disk 62 and the second gap G2. That is, the inner peripheral surface 23a covers the outer edge 12b of the second magnetic disk 62 and the second gap G2 and can stably prevent the flow of the fluid from being turbulent in the vicinity of the second magnetic disk 62.

The number of magnetic disks 12 is 10 or more. As described above, when the number of magnetic disks 12 is large, it may be difficult to provide the first blades 65 in all the gaps G depending on the structures of the plurality of first blades comprising spoiler 19 and the housing 11. However, the HDD 10 of the present embodiment can improve the positioning accuracy of the magnetic head 14 with respect to the desired first magnetic disk 61 among the plurality of magnetic disks 12 by the first blade 65 without significantly changing the structures of the plurality of first blades comprising spoiler 19 and the housing 11.

The inner chamber 25 is filled with helium. A shroud such as the inner peripheral surface 23a can prevent the disk flutter of the magnetic disk 12 more effectively than a case where the inner chamber 25 is filled with air by filling the inner chamber 25 with helium.

The PCB 28 is located outside the housing 11 and is separated from the plurality of magnetic disks 12 in the radial direction orthogonal to the rotation axis Ax. In other words, the PCB 28 does not overlap the plurality of magnetic disks 12 in the axial direction and avoid the plurality of magnetic disks 12 in the radial direction. Accordingly, as many magnetic disks 12 as possible can be disposed in a larger range of the dimensions in the axial direction of the HDD 10. That is, the HDD 10 can prevent the number of magnetic disks 12 from being restricted by the PCB 28.

The inner chamber 25 includes the first chamber 25a in which the plurality of magnetic disks 12 are accommodated and the second chamber 25b which the spoiler 19 and the attachment portion 18a of the FPC 18 are accommodated in and communicating with the first chamber 25a. The housing 11 includes the end portion 11a in the axial direction in which the first chamber 25a and the second chamber 25b are opened, the first bottom surface 21a of the first chamber 25a in the axial direction facing the plurality of magnetic disks 12, and the second bottom surface 21b of the second chamber 25b in the axial direction to which the attachment portion 18a is attached. In the axial direction, the distance between the first bottom surface 21a and the end portion 11a is larger than the distance between the second bottom surface 21b and the end portion 11a. That is, the first chamber 25a is deeper than the second chamber 25b. Accordingly, the first chamber 25a can accommodate more magnetic disks 12.

The plurality of blades comprising spoiler 19 includes the second blade 66 located between the cover 27 and the plurality of magnetic disks 12. In the radial direction orthogonal to the rotation axis Ax, the lengths of the plurality of first blades 65 are equal to each other, and the length of the second blade 66 is smaller than the length of each of the plurality of first blades 65. Accordingly, the second blade 66 can be prevented from interfering with the cover 27. The plurality of first blades 65 can prevent the turbulent flow from occurring equally with each other in the gap G between the plurality of magnetic disks 12.

Second Embodiment

A second embodiment will be described below with reference to FIGS. 6 and 7. It is noted that, in the description of the following embodiments, the components having the same functions as the components already described may be denoted by the same reference numerals as the components described above, and the description may be omitted. The plurality of components denoted by the same reference numerals do not necessarily have all the functions and properties in common and may have different functions and properties according to respective embodiments.

Figure 6:
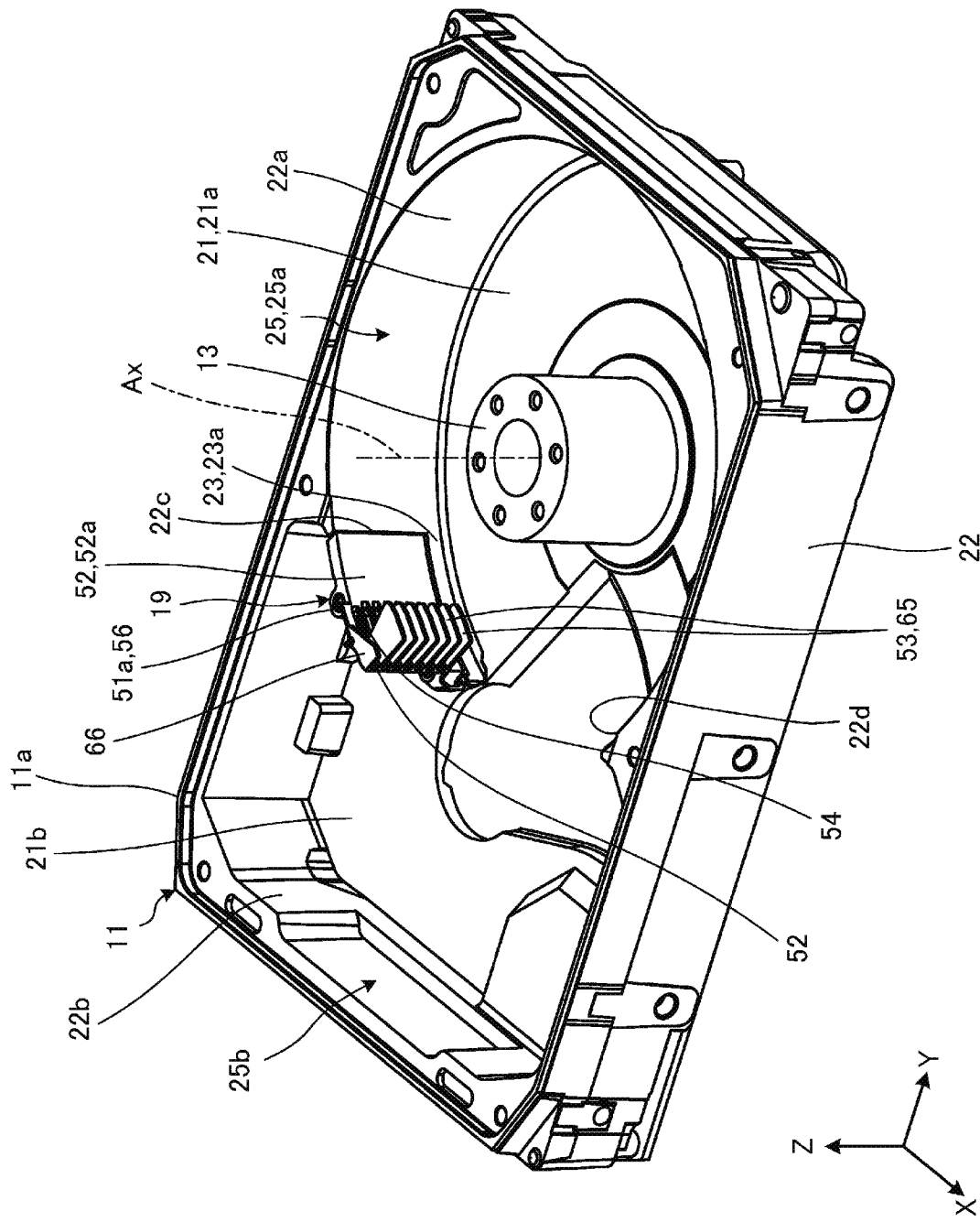
FIG. 6 is a perspective view illustrating a housing and a plurality of blades according to a second embodiment.
Figure 7:
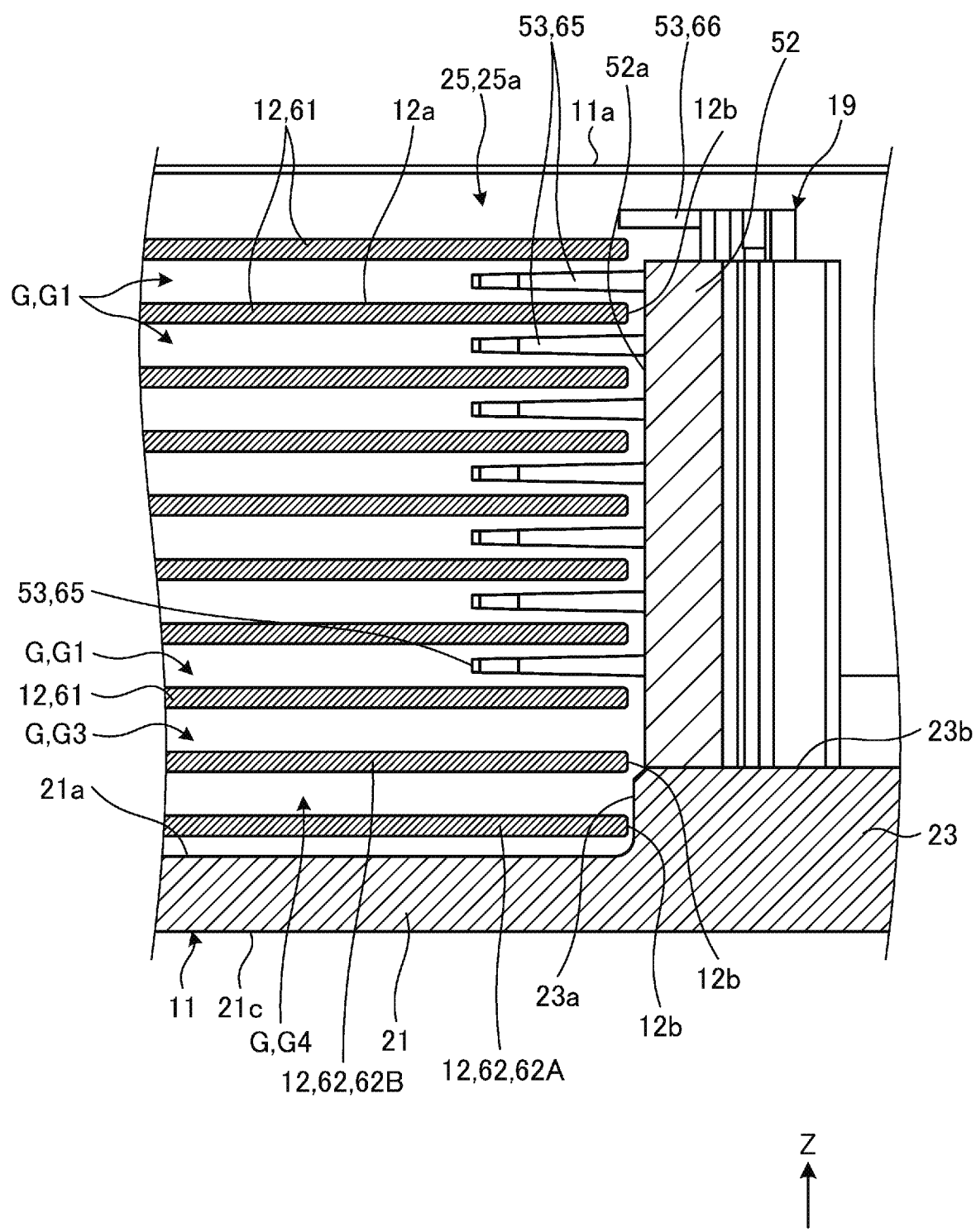
FIG. 7 is a cross-sectional view illustrating the housing, a magnetic disk, and the plurality of blades of the second embodiment.

FIG. 6 is a perspective view illustrating the housing 11 and the plurality of blades forming spoiler 19 according to the second embodiment. FIG. 7 is a cross-sectional view illustrating the housing 11, the magnetic disk 12, and the plurality of blades forming spoiler 19 of the second embodiment. As illustrated in FIG. 7, the HDD 10 of the second embodiment includes, for example, ten magnetic disks 12 and eight blades 53.

In the second embodiment, the ten magnetic disks 12 include the eight first magnetic disks 61 and the two second magnetic disks 62. Hereinafter, the two second magnetic disks 62 may be individually referred to as second magnetic disks 62A and 62B. The second magnetic disk 62A is an example of the second recording medium. The second magnetic disk 62B is an example of the second recording medium and an example of a third recording medium.

The second magnetic disk 62 is two adjacent magnetic disks 12 among the ten magnetic disks 12. The two second magnetic disks 62 are separated from the plurality of first magnetic disks 61 in the −Z direction (axial direction). The second magnetic disk 62B is located between the plurality of first magnetic disks 61 and the second magnetic disk 62A.

The first magnetic disk 61 and the second magnetic disks 62A and 62B are the same magnetic disks 12 as each other. Therefore, each of the first magnetic disk 61 and the second magnetic disks 62A and 62B have the recording surface 12a and the outer edge 12b.

In the second embodiment, the nine gaps G include seven first gaps G1, one third gap G3, and one fourth gap G4. The third gap G3 is an example of the second gap and is an example of the third gap.

The third gap G3 is a gap provided between one of the plurality of first magnetic disks 61 closest to the bottom wall 21 and the second magnetic disk 62B among the plurality of gaps G The fourth gap G4 is a gap provided between the second magnetic disk 62A and the second magnetic disk 62B among the plurality of gaps G.

In the axial direction of the rotation axis Ax, the length (width) of each of the plurality of first gaps G1, the length (width) of the third gap G3, and the length (width) of the fourth gap G4 are substantially equal to each other. The distance between the second magnetic disk 62A and the bottom wall 21 is smaller than each of the first gap G1, the third gap G3, and the fourth gap G4.

The inner peripheral surface 22a of the peripheral wall 22 faces the outer edges 12b of the eight first magnetic disks 61 and the second magnetic disks 62A and 62B. The inner peripheral surface 22a functions as a so-called shroud. Therefore, the inner peripheral surface 22a regulates the flow of helium gas in the inner chamber 25 in the vicinity of the first magnetic disk 61 and the second magnetic disks 62A and 62B, and prevents the turbulent flow from occurring.

The inner peripheral surface 23a of the middle wall 23 faces the outer edge 12b of one second magnetic disk 62A and the fourth gap G4. On the other hand, in the axial direction of the rotation axis Ax, the inner peripheral surface 23a is separated from the outer edge 12b of the eight first magnetic disks 61 and one second magnetic disk 62B. The inner peripheral surface 23a functions as a shroud. Therefore, the inner peripheral surface 23a regulates the flow of helium gas in the inner chamber 25 in the vicinity of the second magnetic disk 62A and prevents the turbulent flow from occurring.

The inner peripheral surface 52a of the wall portion 52 faces the outer edges 12b of the eight first magnetic disks 61 and one second magnetic disk 62B, the first gap G1, and the third gap G3. On the other hand, in the axial direction of the rotation axis Ax, the inner peripheral surface 52a is separated from the outer edge 12b of one second magnetic disk 62A. The inner peripheral surface 52a functions as a shroud. Therefore, the inner peripheral surface 52a regulates the flow of helium gas in the inner chamber 25 in the vicinity of the first magnetic disk 61 and the second magnetic disk 62B and prevents the turbulent flow from occurring.

In the second embodiment, the eight blades 53 include seven first blades 65 and one second blade 66. The seven first blades 65 are located in the seven first gaps G1 out of the nine gaps G On the other hand, the seven first blades 65 do not enter the third gap G3 and the fourth gap G4. The first blade 65 is located outside the third gap G3 and located outside the fourth gap G4.

As described above, the first blade 65 enters the first gap G1 of the gap G and does not enter the third gap G3 and the fourth gap G4. The second blade 66 does not enter any of the plurality of gaps G Therefore, the number of blades 53 entering the gap that is, the number of first blades 65 (7 blades) is smaller than the number of gaps G (9 blades). When assuming that the number of magnetic disks 12 is n, the number of first blades 65 is smaller than (n−2 blades).

None of the plurality of blades 53 is disposed in the fourth gap G4 adjacent to the second magnetic disk 62A. However, the inner peripheral surface 23a of the middle wall 23 as a shroud covers the outer edge 12b of the second magnetic disk 62A from the radial outside of the rotation axis Ax. Accordingly, the inner peripheral surface 23a can prevent the turbulent flow from occurring by regulating the flow of helium gas around the second magnetic disk 62A and can prevent the disk flutter where the second magnetic disk 62A is shaken. As a result, the inner peripheral surface 23a can improve the positioning accuracy of the magnetic head 14 with respect to the second magnetic disk 62A.

None of the plurality of blades 53 is disposed in the third gap G3 and the fourth gap G4 adjacent to the second magnetic disk 62B. However, the inner peripheral surface 52a of the wall portion 52 as a shroud covers the outer edge 12b of the second magnetic disk 62B from the outside in the radial direction of the rotation axis Ax. Accordingly, the inner peripheral surface 52a can prevent the turbulent flow from occurring by regulating the flow of helium gas around the second magnetic disk 62B and can prevent the disk flutter where the second magnetic disk 62B is shaken. As a result, the inner peripheral surface 23a can improve the positioning accuracy of the magnetic head 14 with respect to the second magnetic disk 62B.

As illustrated in FIG. 6, in the second embodiment, a portion of the wall portion 52 extends from the cylinder portion 51 toward the peripheral wall 22. The inner peripheral surface 52a of the wall portion 52 is adjacent to the inner peripheral surface 22a of the peripheral wall 22 with no gap or with a slight gap. Therefore, the plurality of blades forming spoiler 19 can prevent the gap between the inner peripheral surfaces 22a and 52a from deteriorating the effect of preventing the disk flutter by the shroud.

In the HDD 10 of the second embodiment described above, the plurality of blades forming spoiler 19 has the inner peripheral surface 52a extending around the rotation axis Ax and facing the outer edge 12b of the plurality of first magnetic disks 61 and at least one second magnetic disk 62B. The plurality of first blades 65 protrude from the inner peripheral surface 52a and are located in the plurality of first gaps G1 provided between the plurality of first magnetic disks 61 among the plurality of gaps G and located outside the third gap G3 provided between the plurality of first magnetic disks 61 and at least one second magnetic disk 62B among the plurality of gaps G That is, the first blades 65 are disposed in the plurality of first gaps G1, and no first blades 65 is disposed in the third gap G3. The plurality of first blades 65 can improve the positioning accuracy of the magnetic head 14 with respect to the plurality of first magnetic disks 61 by locating the plurality of first blades 65 in the plurality of first gaps G1. On the other hand, the inner peripheral surface 52a extending around the rotation axis Ax faces the second magnetic disk 62B. That is, the inner peripheral surface 52a is an arc-shaped curved surface substantially concentric with the outer edge 12b of the second magnetic disk 62B and covers the outer edge 12b of the second magnetic disk 62B. Therefore, the inner peripheral surface 52a functions as a so-called shroud and prevents the turbulent flow from occurring by regulating the flow of fluid in the vicinity of the second magnetic disk 62B. Accordingly, the inner peripheral surface 52a can prevent the disk flutter of the second magnetic disk 62B. Therefore, the inner peripheral surface 52a can improve the positioning accuracy of the magnetic head 14 with respect to the second magnetic disk 62B. As described above, the HDD 10 of the present embodiment can improve the positioning accuracy of the magnetic head 14 with respect to the second magnetic disk 62B without providing the first blade 65 in the third gap G3.

The plurality of blades forming spoiler 19 has the inner peripheral surface 52a extending around the rotation axis Ax and facing the outer edge 12b of the plurality of first magnetic disks 61 and at least one second magnetic disk 62B. Inner peripheral surface is one example of a common side surface. The plurality of first blades 65 protrude from the inner peripheral surface 52a and are located in the plurality of first gaps G1 provided between the plurality of first magnetic disks 61 among the plurality of gaps G, located outside the third gap G3 provided between the plurality of first magnetic disks 61 and at least one second magnetic disk 62B among the plurality of gaps and located outside the fourth gap G4 provided between at least one second magnetic disk 62A and at least one second magnetic disk 62B. The housing 11 has the inner peripheral surface 23a being aligned with the inner peripheral surface 52a in the axial direction, extending around the rotation axis Ax, and facing the outer edge 12b of at least one second magnetic disk 62A. That is, the first blade 65 is disposed in the plurality of first gaps G1, and no first blade 65 is disposed in the third gap G3 and the fourth gap G4. The plurality of first blades 65 can improve the positioning accuracy of the magnetic head 14 with respect to the plurality of first magnetic disks 61 by locating the plurality of first blades 65 in the plurality of first gaps G1. On the other hand, the inner peripheral surface 52a extending around the rotation axis Ax faces the second magnetic disk 62B. The inner peripheral surface 23a extending around the rotation axis Ax faces the second magnetic disk 62A. The inner peripheral surfaces 23a and 52a function as so-called shrouds to regulate the flow of fluid in the vicinity of the second magnetic disks 62A and 62B and prevent the turbulent flow from occurring. Accordingly, the inner peripheral surfaces 23a and 52a can prevent the disk flutter of the second magnetic disks 62A and 62B. Therefore, the inner peripheral surfaces 23a and 52a can improve the positioning accuracy of the magnetic head 14 with respect to the second magnetic disks 62A and 62B. As described above, the HDD 10 of the present embodiment can improve the positioning accuracy of the magnetic head 14 with respect to the second magnetic disks 62A and 62B without providing the first blade 65 in the third gap G3 and the fourth gap G4.

According to at least one embodiment described above, the disk device includes the plurality of recording media, the plurality of magnetic heads, the spoiler, and the housing. Each of the recording media has the recording surface, is rotatable around the rotation axis extending in the axial direction intersecting the recording surface, and is aligned in the axial direction. The magnetic head is configured to read and write information from and to the plurality of recording media. The spoiler includes the plurality of first blades located in the plurality of gaps provided between the plurality of recording media. The housing is provided with the inner chamber in which the plurality of recording media, the plurality of magnetic heads, and the spoiler are accommodated. The number of first blades is smaller than the number of gaps. The flow of the fluid occurs in the inner chamber by the rotation of the disc-shaped recording medium. The first blade of the spoiler can prevent the flow of the fluid in the gap between the plurality of recording media from occurring and can prevent the disk flutter where the recording medium is shaken. The first blade can prevent the flow of the fluid from hitting the magnetic head located between the plurality of recording media. Accordingly, the first blade can improve the positioning accuracy of the magnetic head with respect to the recording medium. On the other hand, for example, when the number of recording media is large, the number of first blades is also large, and the length of the spoiler in the axial direction is also large. However, the dimensions of the disk device such as a hard disk drive in the axial direction may be constrained by, for example, a standard. Therefore, when the number of recording media is large, it may be difficult to provide the first blades in all the gaps depending on the structure of the spoiler and the housing. On the other hand, in the disk device of the present embodiment, the number of first blades is smaller than the number of gaps. That is, no first blade is disposed in at least one of the plurality of gaps. Therefore, the first blades can improve the positioning accuracy of the magnetic head with respect to the desired one among the plurality of recording media without significantly changing the structure of the spoiler and the housing.

In the above description, prevention is defined as, for example, prevention of the occurrence of an event, action, or effect, or reduction of the degree of event, action, or effect. In the above description, the limitation is defined as, for example, preventing movement or rotation or allowing movement or rotation within a predetermined range and preventing movement or rotation beyond the predetermined range. While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
a plurality of recording media, each recording medium having a recording surface, being rotatable around a rotation axis extending in an axial direction intersecting the recording surface, and being aligned in the axial direction;
a plurality of magnetic heads configured to read and write information from and to the plurality of recording media;
a plurality of first blades attached to a common side surface, the plurality of first blades extending into a plurality of gaps and disposed between the plurality of recording media;
a housing provided with an inner chamber in which the plurality of recording media, the plurality of magnetic heads, and the plurality of first blades are accommodated; and
a plurality of arms pivotally mounted within the inner chamber of the housing, wherein the plurality of magnetic heads are mounted to the plurality of arms,
wherein the number of first blades is smaller than the number of gaps.

2. The disk device according to claim 1, wherein:
the first blades do not extend into at least one gap between the plurality of recording media.

3. The disk device according to claim 1, wherein:
the inner chamber is formed with a wall,
the common side surface is attached to a part of the wall,
the plurality of recording media include a plurality of first recording media aligned in the axial direction, and at least one second recording medium separated from the plurality of first recording media in the axial direction,
the second recording medium is located to closest to the wall among the plurality of recording media,
each of the plurality of first recording media and the at least one second recording medium has an outer edge extending around the rotation axis,
the common side surface extends around the rotation axis and faces the outer edges of the plurality of first recording media and the at least one second recording medium,
the plurality of first blades are located in a plurality of first gaps provided between the plurality of first recording media among the plurality of gaps, and
the first blades do not extend into at least one gap between the first recording media and the second recording media.

4. The disk device according to claim 1, wherein:
the plurality of recording media include a plurality of first recording media aligned in the axial direction, and at least one second recording medium separated from the plurality of first recording media in the axial direction,
each of the plurality of first recording media and the at least one second recording medium has an outer edge extending around the rotation axis,
the common side surface faces the outer edges of the plurality of first recording media,
the plurality of first blades are located in a plurality of first gaps provided between the plurality of first recording media among the plurality of gaps and located outside the second gap provided between the plurality of first recording media and the at least one second recording medium among the plurality of gaps, and
the housing has a first inner peripheral surface aligned with the common side surface in the axial direction, extending around the rotation axis, and facing the outer edge of the at least one second recording medium.

5. The disk device according to claim 1, wherein
the plurality of recording media include a plurality of first recording media aligned in the axial direction, and at least one second recording medium separated from the plurality of first recording media in the axial direction,
each of the plurality of first recording media and the at least one second recording medium has an outer edge extending around the rotation axis,
the common side surface extends around the rotation axis and faces the outer edges of the plurality of first recording media and the at least one second recording medium, and
the plurality of first blades are located in a plurality of first gaps provided between the plurality of first recording media among the plurality of gaps and located outside the second gap provided between the plurality of first recording media and the at least one second recording medium among the plurality of gaps.

6. The disk device according to claim 1, wherein
the plurality of recording media include a plurality of first recording media aligned in the axial direction, at least one second recording medium separated from the plurality of first recording media in the axial direction, and at least one third recording medium located between the the plurality of first recording media and the at least one second recording medium,
each of the plurality of first recording media, the at least one second recording medium, and the at least one third recording medium has an outer edge extending around the rotation axis,
the common side surface extends around the rotation axis and faces the outer edges of the plurality of first recording media and at least one third recording medium,
the plurality of first blades are located in a plurality of first gaps provided between the plurality of first recording media among the plurality of gaps, located outside a third gap provided between the plurality of first recording media and the at least one third recording medium among the plurality of gaps, and located outside a fourth gap provided between the at least one second recording medium and the at least one third recording medium, and
the housing has a first inner peripheral surface being aligned with the common side surface in the axial direction, extending around the rotation axis, and facing the outer edge of the at least one second recording medium.

7. The disk device according to claim 4, wherein
the housing has a second inner peripheral surface extending around the rotation axis and facing the outer edges of the plurality of first recording media and the at least one second recording medium, and
the first inner peripheral surface extends from the second inner peripheral surface around the rotation axis.

8. The disk device according to claim 4, wherein
the housing includes a wall having the first inner peripheral surface and a shaft extending in the axial direction,
the wall has a support surface facing the axial direction and supporting the plurality of first blades,
the shaft is attached on the wall to protrude from the support surface, and
the plurality of first blades is rotatably attached on the wall around the shaft by fitting the shaft into a hole extending in the axial direction.

9. The disk device according to claim 4, wherein
in the axial direction, a length of the first inner peripheral surface is larger than a length of one of the plurality of gaps.

10. The disk device according to claim 1, wherein the number of recording media is 10 or more.

11. The disk device according to claim 1, wherein
the inner chamber is filled with one of a gas having a density lower than a density of air, an inert gas, or helium.

12. The disk device according to claim 1, further comprising:
a board located outside the housing and separated from the plurality of recording media in a radial direction orthogonal to the rotation axis.

13. The disk device according to claim 1, further comprising:
an actuator configured to move the plurality of magnetic heads along the recording surface; and
a flexible printed wiring board including an attachment portion attached to the housing and a flexible portion extending from the attachment portion and being connected to the actuator, wherein
the inner chamber includes a first chamber in which the plurality of recording
media are accommodated and a second chamber in which the plurality of first blades and the attachment portion are accommodated,
wherein the second chamber communicates with the first chamber,
the housing includes an end portion in the axial direction in which the first chamber and the second chamber are open, a first bottom surface of the first chamber in the axial direction facing the plurality of recording media, and a second bottom surface of the second chamber in the axial direction to which the attachment portion is attached, and
in the axial direction, a distance between the first bottom surface and the end portion is larger than a distance between the second bottom surface and the end portion.

14. The disk device according to claim 4, further comprising:
a cover which is attached to the housing and covers the inner chamber, and
a second blade located between the cover and the plurality of recording media,
wherein
in the radial direction orthogonal to the rotation axis, lengths of the plurality of first blades are equal to each other, and a length of the second blade is smaller than a length of each of the plurality of first blades.

15. The disk device according to claim 1, wherein the plurality of first blades forms a spoiler.

16. A disk device comprising:
a housing;
a plurality of recording media, each recording medium having a recording surface and being rotatably supported in the housing;
a plurality of magnetic heads configured to read and write information from and to the plurality of recording media;
a plurality of blades provided between the plurality of recording media; and
a plurality of arms pivotally mounted within the housing, wherein the plurality of magnetic heads are mounted to the plurality of arms, wherein
the number of recording media is n, and
the number of blades is (n−2) or less.

17. The disk device according to claim 1, wherein:
the inner chamber is filled with a gas, and
the plurality of first blades are mounted so that the blades prevent a turbulent flow of the gas in the gap.

18. The disk device according to claim 16, wherein:
a part of the housing is filled with a gas; and
the plurality of blades are mounted so that the blades prevent a turbulent flow of the gas in the gap.

19. The disk device according to claim 1, wherein:
the plurality of arms are different from the plurality of blades.

20. The disk device according to claim 16, wherein:
the plurality of arms are different from the plurality of blades.

* * * * *